July 21, 1953 A. R. MORE 2,645,934
APPARATUS FOR MEASURING THE HARDNESS OF MATERIALS
Filed Sept. 26, 1950
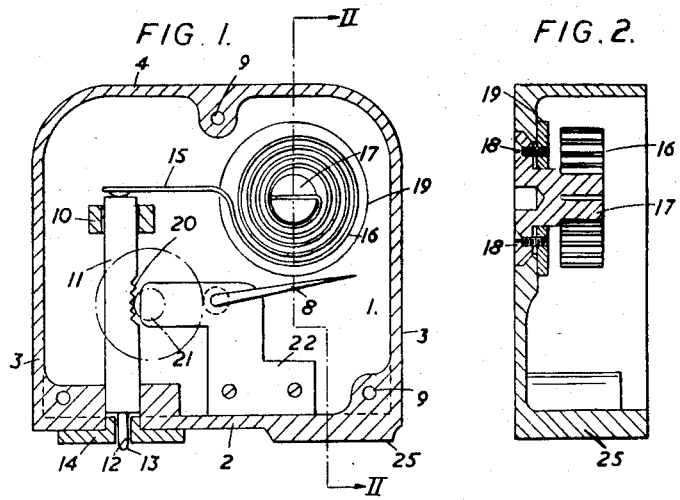
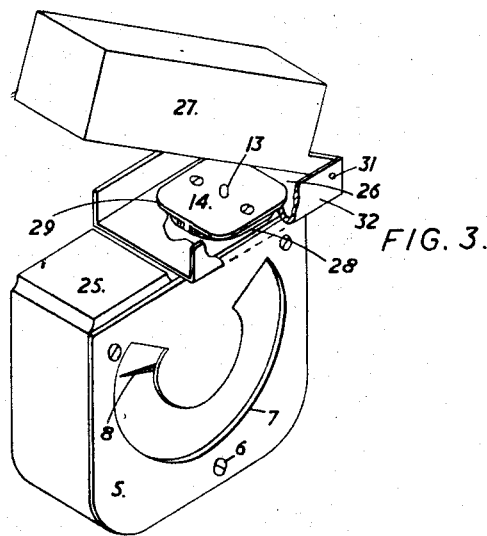
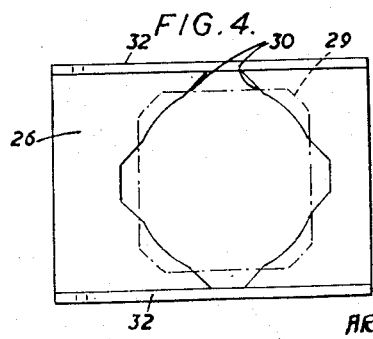
ARTHUR ROWLATT MORE
INVENTOR
BY *Ernest J Mechlin*
ATTORNEY Patented July 21, 1953

2,645,934

UNITED STATES PATENT OFFICE 2,645,934

APPARATUS FOR MEASURING THE HARDNESS OF MATERIALS

Arthur Rowlatt More, Caterham, England, assignor to H. W. Wallace & Company Limited, Croydon, England, a corporation of Great Britain Application September 26, 1950, Serial No. 186,704
In Great Britain January 23, 1948

5 Claims. (Cl. 73—81)

This invention relates to portable lightweight or pocket apparatus for measuring and indicating or recording the hardness of materials of the type employing a spring loaded projecting penetration member operatively connected to an indicator or pointer, the reduction against the spring resistance of the extent to which the member projects, furnishing an indication of the hardness of the specimen, e. g. a sheet or block of rubber or the like.

Various pocket hardness testers of this general character have been hitherto proposed, but none have been found wholly satisfactory as regards accuracy of the readings over the range of hardness within the scope of the tester, ease of adjustment and calibration, facility of reading and general convenience in use and the present invention has for its object to provide an improved form and construction of pocket hardness tester which will furnish readily visible and accurate hardness readings over the required range and which will be convenient and durable in use and easy to adjust.

Broadly stated, a pocket hardness tester according to the present invention comprises a casing having a base or a member attached to its base shaped to rest on the specimen to be tested and support the casing, a penetration member guided vertically within the casing and projecting downwardly through the base, a spiral torsion or clock type spring mounted within the casing so as to urge the penetration member to its projecting position and oppose or resist its inward movement when the base or the member attached thereto is placed on the specimen and a rack and pinion or toothed quadrant gearing operatively connecting the projecting member with a visible indicator.

The indicator may be a needle or pointer moving over a scale appropriately graduated and behind a transparent front or face for the casing, the frame of which face is detachably secured to the casing so as to permit access to the mechanism inside the casing.

Preferably, stop means, which may be adjustable, associated with the guide for the penetration member determine the extent to which such member projects through the base, the spiral spring being also adjustable for calibration and conveniently having an out-turned end forming a leaf bearing on the top of the penetration member.

By using a spiral torsion or clock-type spring with freely spaced coils it is possible to obtain a more nearly constant force on the penetration member than with the helical spring hitherto used in many types of hardness measuring instruments.

A check weight may be provided as an auxiliary member for the hardness tester for weighing down the projection when the tester is inverted so as to ascertain whether the spring is correctly adjusted, and in order to reduce the mass necessary for this check-weight, it may be furnished with a removable pivotal attachment to the base in the vicinity of the projecting penetration member.

In a specific embodiment of the improved pocket tester the casing is a die casting suitably of zinc alloy of general rectangular form in plan and mantel clock shape, bosses on the interior walls providing vertically aligned guides near one end for a rod or plunger, a portion of which projecting downwardly through the base and terminating in a hemispherical end constitutes the penetration member. The aforementioned clock-type spiral spring is mounted within the casing on an adjustable arbor and has its outer end bearing on the top of the rod or plunger, urging it downwardly to an extent determined by a stop which, as will be appreciated, is set so that the penetration member projects to a predetermined extent.

This embodiment will now be further described with reference to the accompanying drawings which show it by way of example and in which Fig. 1 is a longitudinal vertical section and Fig. 2 a cross section on the line II—II of Fig. 1.

Fig. 3 is a perspective view showing the tester inverted and the pivotal attachment of the check-weight in place while Fig. 4 is a detail view of the bracket providing the removable pivotal attachment for the check-weight.

Referring now to the drawings, 1 represents the rear wall of the hollow cast casing which has a base 2 side walls 3 and a top 4, and an open front normally closed by a removable face 5 secured by screws 6 and having an aperture 7 across which is a transparent material wherethrough an indicator needle 8 moving over a suitably calibrated dial may be seen.

The screws 6 engage in tapped holes 9 in bosses cast on the interior of the casing walls, and from the rear wall 1 projects forwardly an upper bearing 10 for a rod or plunger 11 which passes downwardly through an aperture in the base 2 and terminates in a pin 12 having a hemispherical end 13 constituting the penetration member.

14 is a stop member serving to limit the downward movement of the plunger 11 which is urged downwardly by the out-turned end 15 of a clock-type spiral spring 16 mounted within the casing on an adjustable arbor 17, the bottom of such member 14 providing a reference face adapted to rest on the specimen.

Provision is made for adjusting the spring pressure from outside the instrument by winding the arbor 17 with a key after slackening screws 18 which engage in a friction washer 19 concentric with the arbor and which are tightened after the instrument has been properly adjusted.

A portion of the plunger 11 is formed with rack teeth 20 enmeshed with the first pinion 21 of a gear train the final component whereof carries the indicator needle 8, such gear train being carried as a unit in a sub-frame 22 with the axis of the needle 8 located below the middle of the casing so that the needle has an arc of movement of 200°–220° to which the aperture 7 corresponds.

The bottom of the casing is formed with a plinth 25 to provide a support level with the lower reference face of the stop member 14 and the latter is adapted for the temporary securement of a bracket 26 forming the pivotal attachment for a check-weight 27 when the instrument is being adjusted or zeroised.

For this purpose the instrument is inverted and, as shown in Fig. 3 the stop member 14 has a part circular periphery at 28 which develops into four lips or corner flanges of a retaining plate 29 integral with the member 14.

The bracket 26 has an aperture 30 which can be passed over this plate 29 and when the bracket is turned through 45° it is securely positioned on the circular periphery 28 and held by the four corners of the retaining plate 29 as illustrated in Figs. 3 and 4.

The check-weight 27 is pivoted at 31 to channel walls 32 of the bracket and it will be understood that the arbor 17 of the spring is set while the check-weight is bearing on the penetration member 12.

If desired for convenient reading, the front face and dial of the tester may be inclined rearwardly towards the top, or the dial may be arranged horizontally on the top of the instrument, in either of which cases it may be advantageous to make the graduated scale move and to provide a fixed reading index.

By the present invention an improved, convenient and durable construction of portable hardness tester is obtained.

What I claim is:

1. A pocket hardness tester comprising in combination a casing having a base, a movable penetration member projecting downwardly through said base, means guiding said penetration member vertically in relation to said casing, a spiral torsion spring on a horizontal axis with freely spaced coils and with one end adjustably anchored in relation to the casing while its other end projects from the coils and resists upward movement of the penetration member, an indicator, and means operatively connecting said indicator with the penetration member to cause said indicator to indicate movements of the penetration member.

2. A pocket hardness tester according to claim 1 including an arbor for holding the anchored end of the spring, which arbor is adjustable from outside the casing for increasing or decreasing the spring pressure on the penetration member to effect calibration, and means for securing said arbor in any adjusted position.

3. A pocket hardness tester comprising in combination a casing having a base, a vertical plunger in said casing, a penetration member carried by said plunger and projecting downwardly through said base, means guiding said plunger vertically in relation to said casing, a spiral torsion spring on a horizontal axis with freely spaced coils and with one end adjustably held in relation to the casing while its other end projects horizontally from the coils to bear on the upper end of the plunger and resist upward movement thereof, an indicator and means operatively connecting said indicator with the plunger to cause said indicator to indicate movements of the penetration member.

4. A pocket hardness tester comprising in combination a casing having a base, a vertical plunger in said casing, a penetration member carried by said plunger and projecting downwardly through said base, means guiding said plunger vertically in relation to said casing, a spiral torsion spring on a horizontal axis with freely spaced coils and with one end adjustably held in relation to the casing while its other end projects horizontally from the coils to bear on the upper end of the plunger and resist upward movement thereof, an indicator pointer, a scale adjacent to said pointer, rack teeth on said plunger, and a gear train the first gear whereof meshes with said rack teeth while its final gear component carries and drives said pointer.

5. A pocket hardness tester according to claim 4 wherein the gear train is carried as a unit in a sub-frame secured to the casing and the pointer has an arc of movement of 200°–220°.

ARTHUR ROWLATT MORE.

References Cited in the file of this patent
UNITED STATES PATENTS

| Number | Name | Date |
|---|---|---|
| 1,483,565 | Adams | Feb. 12, 1924 |
| 1,597,668 | Brier | Aug. 31, 1926 |
| 1,661,718 | Davis | Mar. 6, 1928 |
| 2,323,925 | Markwardt | July 13, 1943 |
| 2,372,662 | Dewey | Apr. 3, 1945 |